Patented June 16, 1931

1,810,174

UNITED STATES PATENT OFFICE

WILLY O. HERRMANN, HANS DEUTSCH, AND WOLFRAM HAEHNEL, OF MUNICH, GERMANY, ASSIGNORS TO CONSORTIUM FUR ELEKTROCHEMISCHE INDUSTRIE, OF MUNICH, GERMANY

PROCESS FOR THE PRODUCTION OF CONDENSATION AND POLYMERIZATION PRODUCTS OF ACETYLENE

No Drawing. Application filed January 16, 1925, Serial No. 2,945, and in Germany January 23, 1924.

We have found that it is possible to obtain condensation and polymerization products of acetylene of resinous or cuprene-like nature by causing acetylene to react upon organic substances in the presence of catalysts. Examples of such organic substances are aliphatic and cyclic hydrocarbons such as paraffin, hexane, methane, benzol, xylol, naphthalene and hexalin. In addition derivatives of aliphatic hydrocarbons such as alcohols, glycols, chlorides, or mixtures of these substances may be used. Among the catalyzers the salts of mercury and aluminum are especially applicable.

The formation of the condensation and polymerization products may be favored by heating and in many cases by the addition of activators, especially acids, alkalies and other substances of acid or basic reaction.

Example I

In 900 parts of glacial acetic acid 74 parts of acetate of mercury are dissolved while warming. A solution of 77 parts of benzene sulfonic acid in 100 parts of glacial acetic acid are allowed to flow into this hot liquid while stirring. Acetylene is introduced into the emulsion of mercury benzene sulfonate formed in this way. A rapid absorption of acetylene takes place. On continuing the reaction the liquid becomes thicker. After the absorption of acetylene is finished the reaction mixture is heated for some time at a temperature of from 90° to 100° C. A semi-solid sticky mass is formed from which a resin-like substance is obtained by washing with water.

Example II

An emulsion is made by mixing 1000 parts of amyl alcohol and 50 parts of ground sulphate of mercury. Into this emulsion acetylene is introduced at a temperature of 110° C. until the absorption of acetylene which was very rapid at first, becomes slow. The reaction liquid becomes brownish in color and more viscous. It is then clarified by sedimentation and decantation. It can be used directly as a lacquer or the resin formed by the reaction can be obtained in the solid state by distilling off the amyl alcohol.

Example III 100 parts of anhydrous aluminum chloride are added to 1000 parts of dry benzol and acetylene is introduced into this emulsion at a temperature of about 90° C. while stirring. During the rapid absorption the reaction mixture becomes thicker and is finally transformed into a black mass of tar-like character. Then the reaction product is mixed with water and a powder-like substance is produced. The excess of benzol is distilled off by means of steam and a cuprene-like substance is obtained.

Example IV 50 parts of sulphate of mercury are added to 1000 parts of hexane. Into this emulsion dried acetylene is introduced at a temperature of 50° C. while stirring. When the absorption of acetylene ceases the reaction mixture is heated for some hours using a reflux condenser. The excess of hexane is distilled off by means of steam. The residue contains a solid resin.

Example V

Into an emulsion of 1000 parts of chlorbenzol and 50 parts of sulphate of mercury acetylene is introduced until the absorption becomes slow. The viscous reaction mass is mixed with water and the volatile components are distilled off by means of steam.

Depending upon the conditions under which the reaction is carried out the condensation and polymerization products will be more similar to aldehyde resins or to cuprene. In case the substances more similar to aldehyde resins are obtained they may be improved by subjecting them to known processes for improving aldehyde resins.

What we claim is:

1. Process for the production of water insoluble condensation and polymerization products which consists in causing acetylene to react in the absence of water and in the presence of a catalytically acting salt selected from the group consisting of the salts of mercury and aluminium, upon a compound selected from the group consisting of hydrocarbons, halogen substituted hydrocarbons and aliphatic alcohols and carrying the condensation beyond the stage of oily reaction products.

2. Process for the production of water insoluble condensation and polymerization products which consists in causing acetylene to react in the absence of water and in the presence of a catalytically acting salt selected from the group consisting of the salts of mercury and aluminium, upon a hydrocarbon and carrying the condensation beyond the stage of oily products.

3. Process for the production of water insoluble condensation and polymerization products which consists in causing acetylene to react in the absence of water and in the presence of a catalytically acting salt selected from the group consisting of the salts of mercury and aluminium, upon a compound selected from the group consisting of hydrocarbons, halogen substituted hydrocarbons and aliphatic alcohols while heating and carrying the condensation beyond the stage of oily reaction products.

4. Process for the production of water insoluble condensation and polymerization products which consists in causing acetylene to react in the absence of water and in the presence of a catalytically acting salt selected from the group consisting of the salts of mercury and aluminium, and a strong acid upon a compound selected from the group consisting of hydrocarbons, halogen substituted hydrocarbons and aliphatic alcohols and carrying the condensation beyond the stage of oily reaction products.

5. Process for the production of water insoluble condensation and polymerization products which consists in causing acetylene to react in the absence of water and in the presence of mercury salt, upon a compound selected from the group consisting of hydrocarbons, halogen substituted hydrocarbons and aliphatic alcohols and carrying the condensation beyond the stage of oily reaction products.

6. Process for the production of water insoluble condensation and polymerization products which consists in causing acetylene to react in the absence of water and in the presence of a mercury salt, and sulfuric acid in non-sulfonating amounts upon a compound selected from the group consisting of hydrocarbons, halogen substituted hydrocarbons and aliphatic alcohols and carrying the condensation beyond the stage of oily reaction products.

7. Process for the production of water insoluble condensation and polymerization products which consists in causing acetylene to react in the absence of water and in the presence of a catalytically acting salt selected from the group consisting of the salts of mercury and aluminium and a strong acid upon a compound selected from the group consisting of hydrocarbons, halogen, substituted hydrocarbons and aliphatic alcohols while heating and carrying the condensation beyond the stage of oily reaction products.

WILLY O. HERRMANN.
HANS DEUTSCH.
WOLFRAM HAEHNEL.